(No Model.)
H. W. MYERS.
BICYCLE LOCKER.
No. 577,808. Patented Feb. 23, 1897.
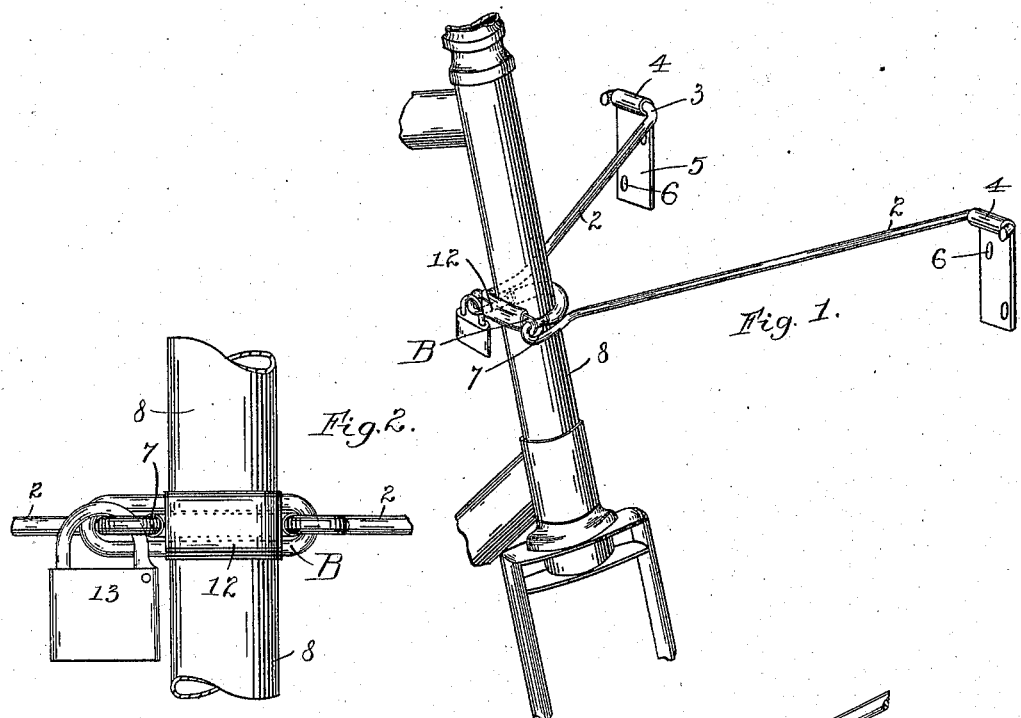
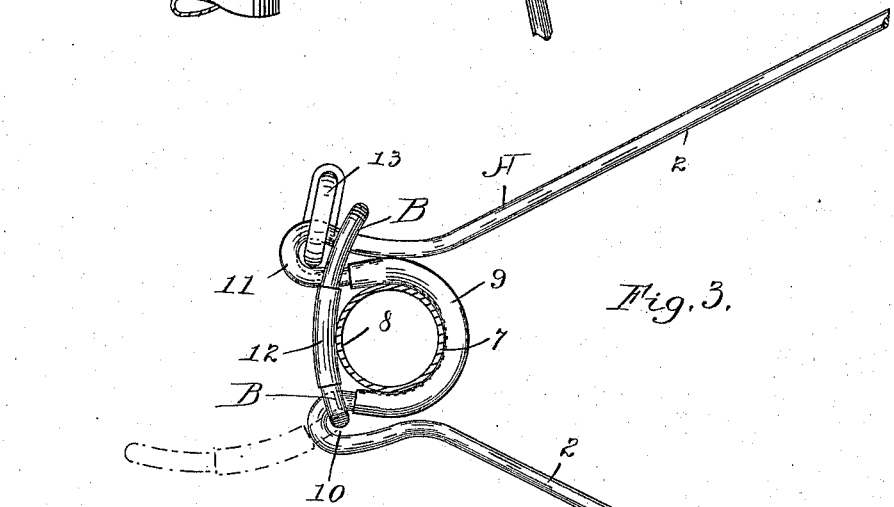
Witnesses:
F. G. Bradbury.
A. S. Johnson.
Inventor:
Howard W. Myers.
per: T. D. —
Attorney.

UNITED STATES PATENT OFFICE.

HOWARD W. MYERS, OF ST. PAUL, MINNESOTA.

BICYCLE-LOCKER.

SPECIFICATION forming part of Letters Patent No. 577,808, dated February 23, 1897.

Application filed April 13, 1896. Serial No. 587,405. (No model.)

*To all whom it may concern:*

Be it known that I, HOWARD W. MYERS, of St. Paul, Ramsey county, Minnesota, have invented certain Improvements in Bicycle-Lockers, of which the following is a specification.

My invention relates to improvements in bicycle-lockers adapted to be fixed to a wall and to extend therefrom to engage a bicycle, being provided with means for locking the machine thereto.

To this end my invention consists in providing a bracket or brace having hinged support upon the wall. This brace is preferably of V shape, with the free ends of its arms hinged to clips which are secured to the wall and having an inwardly-bent socket or recess at its apex to receive the upright post or standard of the bicycle. The bicycle-standard is locked in place in this recess by means of a hasp hinged to an eye in the brace adjacent one side of the recess and fitting over a similar eye upon the opposite side, so as to inclose the bicycle-standard, the recess and hasp being preferably covered with soft material to prevent abrasion of the bicycle.

My invention further consists in the specific construction and combination hereinafter more particularly described and claimed.

In the accompanying drawings, forming part of this specification, Figure 1 is a view of my invention attached to the wall and showing a bicycle locked thereto. Fig. 2 is a partial detail of the same; and Fig. 3 is a cross-section of the upright post of the bicycle shown locked to the brace, the dotted lines showing the position of the hasp when turned back.

In the drawings, A represents the brace, preferably of V shape, the arms 2 of the brace having their free ends 3 outturned and fitted into the eyes 4 of the clips 5, which are secured to the wall by nails or screws 6. The brace is thus adapted to turn in said eyes, so as to swing downward against the wall when not in use. The outer end or apex of the brace is formed with a central reverse bend 7 of such size and shape as to receive the upright tube 8 of the bicycle-frame, said bend being covered with suitable soft material 9, such as rubber, to prevent abrasion of the bicycle. Hinged to the eye 10, formed by the bend in the brace adjacent one side of the recess 7, is the hasp B, adapted to fit over the opposite similar eye 11, so as to hold the upright tube of the bicycle-frame in place in the recess, as shown in Fig. 3. This hasp is also covered with suitable soft material 12 to prevent it from marring the bicycle-frame. When the hasp has been fitted over the eye 11 to inclose the upright tube of the bicycle, the padlock 13 is locked to said eye, so as to prevent the hasp B being turned back and the bicycle removed. When it is desired to remove the bicycle, the padlock is detached and the hasp B swung back, as shown in dotted lines in Fig. 3, thus allowing the bicycle to be separated from the locker.

The bend forming the eye 11 is of greater width than at the side adjacent the recess 7, so that the hasp when forced over the eye will be held in place by said bend. Where there is no danger of the bicycle being stolen and it is only desired to hold it in place, I may wish to use my invention in this manner, so as to dispense with the use of the padlock.

By means of my construction I provide a locker which will firmly secure the bicycle in place adjacent the wall, the locker when released swinging upon its hinged connection downward against the wall, so as to be out of the way.

I claim—

1. As an improved article of manufacture, a device of the class described, formed of wire or rod of substantially V shape, adapted to be hinged by its ends to a relatively-fixed support, the apex being inwardly bent upon itself to form a recess for the bicycle-post, and the means for holding the post in said recess.

2. As an improved article of manufacture, the substantially V-shaped bracket or brace adapted to be connected to a relatively-fixed support, and being formed at its apex with a central reverse bend, constituting a recess to receive the post of the bicycle, the bends on each side of the recess constituting eyes, and the hasp hinged in one of said eyes, and adapted to engage the opposite similar eye to hold the bicycle in place.

3. As an improved article of manufacture, a device of the class described, formed of a single piece of wire or rod, of substantially V shape, adapted to be connected by its ends to a relatively-fixed support, the apex being inwardly bent upon itself to form a socket for the bicycle-post, the hasp hinged to the eye formed by the bend on one side of said socket, and adapted to engage the opposite bend, and means for locking it in such engagement.

4. In combination with the relatively-fixed support, the V-shaped brace hinged thereto, having a reverse bend or socket in its outer end, the hasp hinged to an eye in one side of said bend and engaging an opposite similar eye, and the lock for engaging said opposite eye to secure said hasp in closed position.

5. As an improved article of manufacture, the V-shaped bracket or brace having the free ends of its arms hinged to clips, which are secured to the wall, and being formed at its apex with a central reverse bend or recess to receive the upright post of the bicycle, the hasp hinged to one side of said recess, and the lock for securing the free end of the hasp to the other side of said recess, so as to inclose the upright post of the bicycle, said recess and hasp being covered by suitable soft material to prevent abrasion of the bicycle.

In testimony whereof I affix my signature in presence of two witnesses.

HOWARD W. MYERS.

Witnesses:
H. S. JOHNSON,
MINNIE L. THAUWALD.